Figure 2:
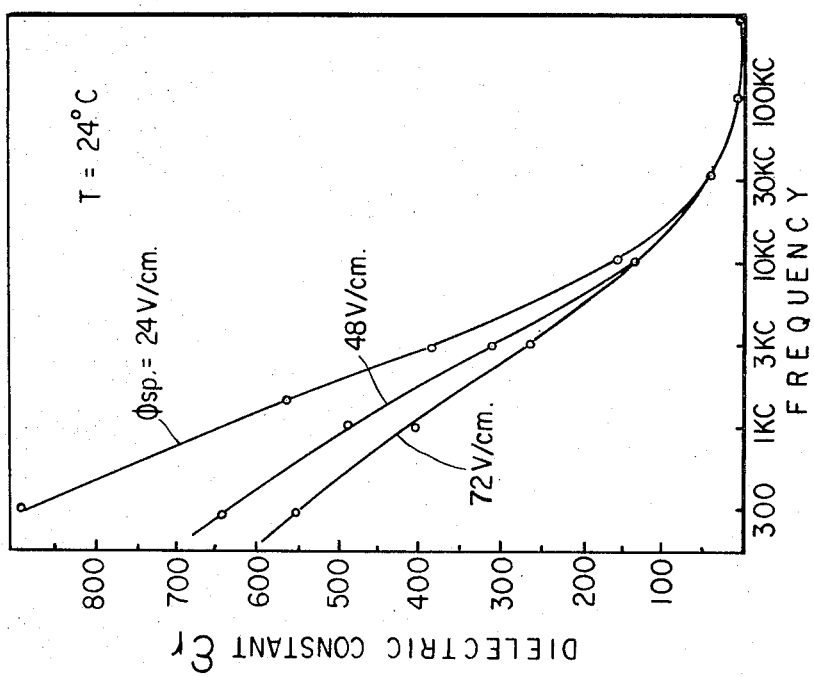

Oct. 24, 1967　　　H. A. POHL　　　3,349,302
CAPACITORS

Filed July 21, 1964　　　　　　　　　　4 Sheets-Sheet 1

INVENTOR
HERBERT A. POHL
BY
Hammond and Littell
ATTORNEYS

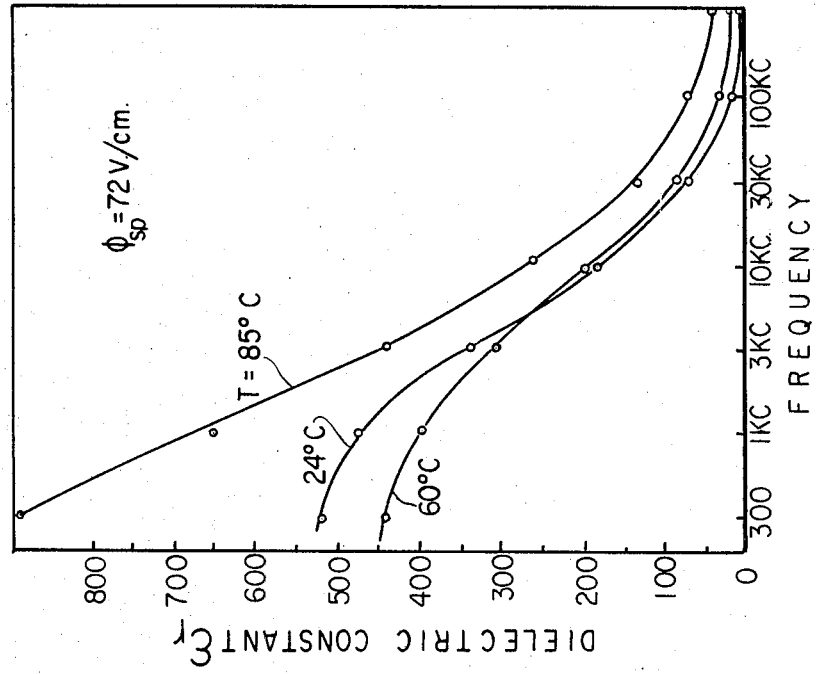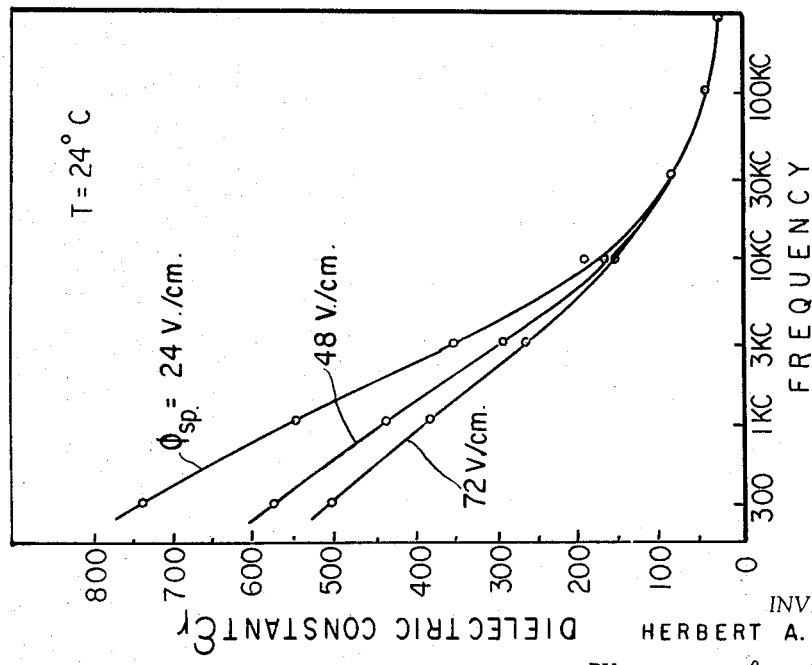

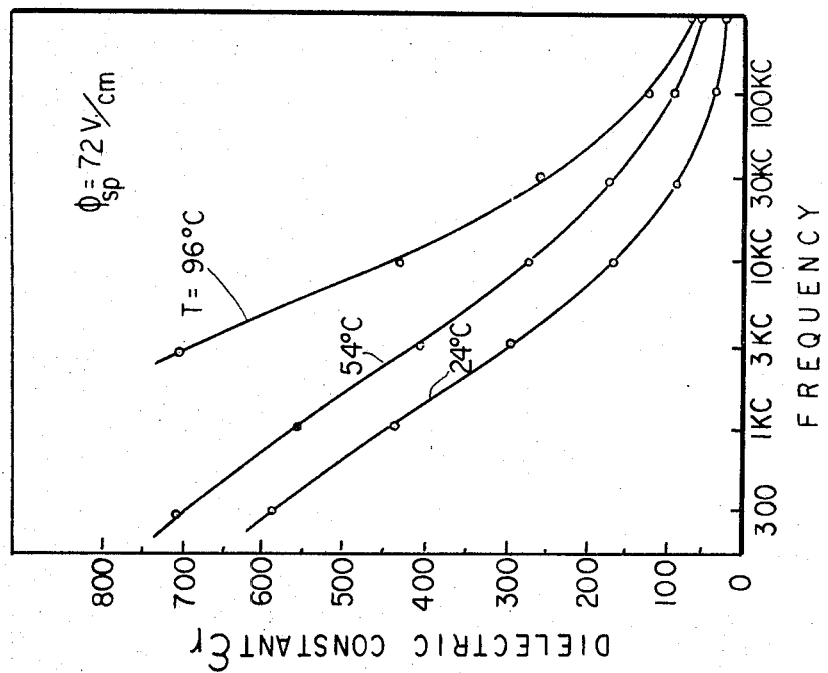
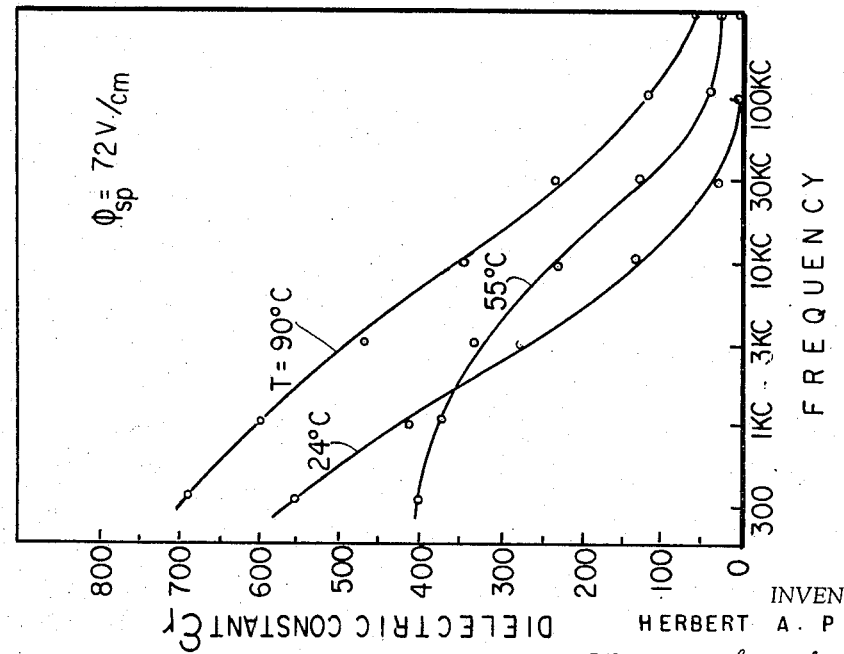
Fig. 6
Fig. 5

United States Patent Office 3,349,302
Patented Oct. 24, 1967

3,349,302
CAPACITORS
Herbert Ackland Pohl, Uppsala, Sweden, assignor to Sci-Tech Corporation, Princeton, N.J., a corporation of New Jersey
Filed July 21, 1964, Ser. No. 384,054
7 Claims. (Cl. 317—258)

The present invention relates to an improvement in capacitors. More particularly, this invention relates to the use of homogeneous electronically-conductive molecular solids having a specific resistivity of over about $10^3$ ohm-centimeters at 25° C. as the dielectric in capacitors.

As is well known, two conductors separated by some insulating material or dielectric form a capacitor. One measure of the effectiveness of a capacitor is its capacitance according to the formula $$C = \frac{2.24 \times K \times A}{s \times 10^7} = K \cdot C_o$$

where C is the capacitance in microfarads, K is the dielectric constant of the dielectric, A is the total area of dielectric between the plates in square inches and $s$ is the thickness of the dielectric in inches. It can thus be seen that the capacitance of a capacitor is directly proportional to the dielectric constant of the dielectric. The dielectric constant of a material is the ratio of the capacitance C with that material as dielectric to the capacitance of the same capacitor, $C_o$, when the dielectric is a vacuum. The dielectric constant is normally a function of the specific temperature, frequency and pressure employed during the measurement.

In the construction and use of capacitors it is highly desirable to hold the overall volume to an absolute minimum. This means employing capacitors containing materials of the highest possible dielectric constant. It is further desired to have the capacitors built of materials possessing the highest possible chemical stability. It is also often desired for specific purposes to have high responsiveness of the capacitance to the frequency of the voltage applied, and to the temperature.

Most materials commonly utilized for dielectrics have dielectric constants of from 1.6 to 10. The commonly known solid organic substances also have dielectric constants of from about 2 to 10. Organic solids with higher dielectric constants are few and far between. A very few organic liquids do show dielectric constants up to about 150, but other undesirable characteristics associated with their liquid character stand in the way of their usage in making condensers of small specific volume. In addition, some inorganic materials such as barium titanate have high dielectric constants.

It is an object of the present invention to produce capacitors of high capacitance in a minimum volume by the utilization of homogeneous electronically-conductive molecular solids having a specific resistivity over about $10^3$ ohm-centimeters at 25° C.

A further object of the present invention is the development of a capacitor having a high capacitance in a minimum volume comprising metal conductors separated by a dielectric consisting of a homogeneous, electrically-conductive molecular solid having a specific resistivity over about $10^3$ ohm-centimeters at 25° C.

Another object of the invention is the production of a capacitor containing a dielectric having a dielectric constant of over 20 with a high responsiveness to the frequency of the applied voltage, said dielectric being a chemically stable microscopically-homogeneous, electronically-conductive, polymeric molecular solid having a specific resistivity over about $10^3$ ohm-centimeters at 25° C.

These and other objects of the invention will become more apparent as the description thereof proceeds.

I have found that a radical advance in the miniaturization of capacitors can be obtained by the incorporation of a certain very special class of materials as dielectric between metallic or metaloid conducting plates. This special class of dielectric materials is that defined as "eka-conjugated," microscopically-homogeneous, electronically-conductive, organic-polymer, molecular solids having a specific resistivity of over about $10^3$ ohm-centimeters at 25° C. Among this group of molecular solids are found materials having dielectric constants of from 500 to 1000 and over. Use of these materials permits an enormous factor of miniaturization of capacitor design, and other associated beneficial characteristics as will be apparent.

Figure 1:
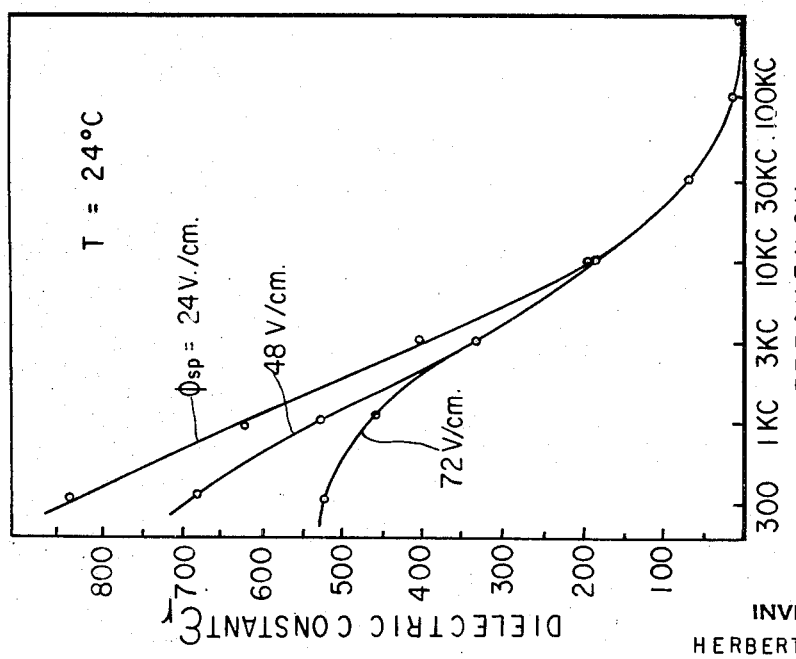

In the drawings, FIGURES 1, 2 and 3 show the variations of the relative dielectric constant $\epsilon_r$ versus frequency at several constant field strengths at a temperature of 24° C. for various materials of the invention. FIGURES 4, 5 and 6 show the variations of the relative dielectric constant $\epsilon_r$ versus frequency at several temperatures at a constant field strength of 72 volts/cm.

Figure 7:
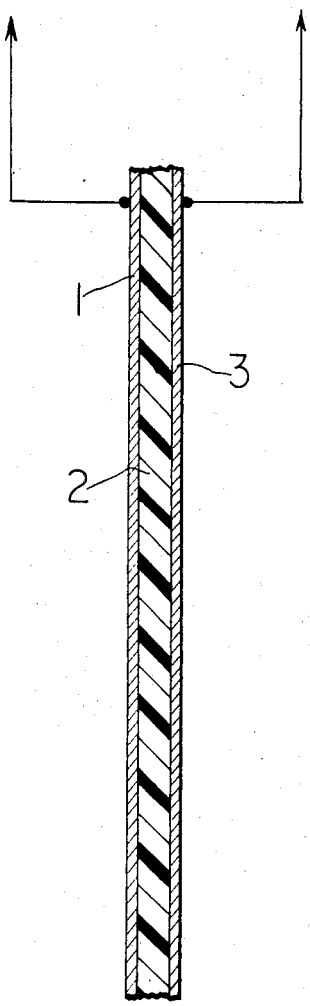

FIGURE 7 represents a cross-section of a capacitor of the invention. This capacitor consists of two metal or metaloid plates 1 and 3 having electrical connections separated by a dielectric 2 consisting of a homogeneous, electrically-conductive molecular solid having a specific resistivity over about $10^3$ ohm-centimeters at 25° C.

A molecule is said to be eka-conjugated if the number of alternate single and multiple bonds is so large that the molecule exists in electronically excited states to an appreciable degree (greater than $10^{-12}$ mol fraction) at room temperature. These eka-conjugated molecules with their large number of loosened electrons are prone to conduct electronically. These eka-conjugated molecules when formed into molecular solids, preferably by a molding operation, either by themselves, or perhaps with common molding additives, can be referred to as microscopically-homogeneous, electronically-conductive, organic-polymer molecular solids having a highly conjugated molecular structure and a specific resistivity of over $10^3$ ohm-centimeters at 25° C. The term "eka-conjugated" was designed to indicate a molecular system consisting of large molecules with both a high degree of conjugation (in the traditional alternate single-multiple carbon bond series), and an intramolecular arrangement such that there exist an appreciable number of free radical and ionic states at room temperature. Within these large molecules, an adopted charge, whether positive or negative as caused by intermolecular ionization, appears to be able to move rather freely along the majority of the large molecules. Each charged molecule then becomes a large potential monopole or dipole in concert with others under the influence of the external field.

The highly conjugated organic polymers of the above class are covalently bonded or perhaps even partly ionically bonded. The TCNQ polymers (tetracyanoquinodimethane polymers) reported by Kepler et al., Phys. Rev. Letters, 5, 503–4 (1960) contain examples of both covalent and ionic bonds. The covalently bonded polymers can be bonded in regular covalency, such as the polyacetylene polymers, or in dative covalency, such as the molecular complexes of pyrene-iodine polymers or ferrocene polymers. The eka-conjugated organic polymers are primarily of the regular covalent type.

Examples of the type of polymers utilized in the invention are the following:

A. COVALENTLY BONDED TYPE (1) The so-called PAQR or polyacene quinone radical polymers. These PAQR polymers are produced by condensation of aromatic hydrocarbons or substituted aromatic hydrocarbons with carboxylic acid derivatives, preferably aromatic hydrocarbon polycarboxylic acid derivatives by a Friedel-Crafts type of reaction. The condensation may be accomplished, for example, by the use of certain catalysts such as zinc chloride, aluminum chloride, phosphoric acid or sulfuric acid at temperatures from room temperature up to 400° C. A preferred temperature of operation, for example, for aluminum chloride catalyzed polymers would be between about room temperature and about 100° C. For the zinc chloride catalyzed polymers it is from 250° C. to 306° C., although temperatures up to 450° C. may be used. Details may be found in a paper by H. A. Pohl and E. H. Engelhardt, "Synthesis and Characterization of Some Highly Conjugated Semiconducting Polymers," J. Phys. Chem., 66, 2085 (1962).

(2) The Schiff's Base Polymers. These polymers are prepared by the well known organic chemical reactions using difunctional monomer pairs such as those of quinones and aromatic diisocyanates as described by Pohl et al., ibid.

(3) The polyacetylene polymers. These polymers are prepared by polymerizing aromatic acetylenes as described by Berlin, Khim. Teknol. Polymerov., 7–8, 139–58 (1960), [Translation in English, Standard Oil Co. (Ind.), Information Div., Translation TRO 60–122].

(4) The polyacene polymers such as poly-phenyl and the like, or violanthrene. These polymers are prepared by reacting a polyhalogenated aromatic compound in a Wurtz-Fitting type reaction as described by Edwards et al., J. Polymer Sci., 16, 589 (1955).

(5) Polymers prepared by sulfurizing or vulcanizing aromatic hydrocarbons with sulfur at elevated temperatures on the order of 100° to 400° C.

(6) Polythioether polymers. These polymers are prepared by condensing a polyhalogenated aromatic thiol in the presence of a strong base such as molten potassium hydroxide as described by Pohl, "Semiconduction in Polymers, a Review," Princeton Univ. Plastics Lab. Techn. Report No. 61D (1961).

(7) The polyphthalocyanine polymers. These polymers are formed by heating tetracyanobenzene in contact with a heavy metal such as copper or iron. Cf. book on "Phthalocyanine Compounds," F. H. Moser & A. L. Thomas (Reinhold Publishing Corp., N.Y., 1960).

(8) The polyferrocene carbonyl or the ferrocene ketone polymers. These polymers contain ferrocene groups linked by carbonyl groups and are described by Pohl, ibid., "Semiconduction in Polymers, a Review" and Mette et al., Bull. Amer. Phys. Soc. II, 6, 294 (1961).

B. DATIVELY BONDED "INFINITE ORDER" COMPLEXES (1) Pyrene-iodine, formed by precipitation from a solution of pyrene in benzene and a solution of iodine in benzene.

(2) The polyferrocene carbonyl or ferrocene ketone polymers (A-8 above) may alternately be considered of this type.

The preferred polymers for use in the present invention as dielectric material are the PAQR polymers and the metal doped PAQR polymers as described by Pohl et al., J. Physical Chem. 66, 2085–95 (1962); Pohl et al., J. Amer. Chem. Soc. 84, 2699–2704 (1962); Pohl et al., J. Physical Chem. 66, 2121–6 (1962), and Pohl, Bornmann and Ito, "Studies of Some Semiconducting Polymers," chapter in "Organic Semiconductors," edited by Brophy and Buttrey, McMillan, 1962, page 143.

The following examples are given to illustrate the invention. It is to be understood that other procedures known to those skilled in the art may be employed without departing from the invention.

*Examples 1–7*

Equimolar amounts of terphenyl and pyromellitic dianhydride were mixed in a mortar. About 2 mols of zinc chloride, as catalyst, were added for every mol of acid anhydride. After a thorough mixing of the components they were placed in a glass-lined reaction chamber and heated to a temperature between about 256° and 306° C. The heating was continued for about 24 hours.

At the completion of polymerization the polymer was ground to a fine powder. The material was leached with dilute hydrochloric acid for 12 hours to aid in removing the zinc chloride catalyst. Subsequent to the leaching, the powder was extracted with water for 12 hours, ethanol for 24 hours and benzene for 12 hours, in a Soxhlet apparatus. The polymer was then dried at 50° C. for 12 hours. After drying, the material was again finely ground and stored in a desiccator until evalutions were to begin.

The zinc chloride-catalyzed PAQR polymers were, in all cases, black, insoluble, infusible materials containing at most from 1 to 5 p.p.m. of Zn. Yields expressed as the ratio of polymer to dianhydride-plus-acene ranged from approximately 5 to 50% depending on the reactivity of the particular acene utilized.

Determinations of the conductivity and dielectric constant for the polymers tested were made using a conventional bridge circuit.

The samples which initially were in the form of a crystalline powder were molded into small pellets between two circular tungsten carbide pistons. The contact area between the two pistons was surrounded by a Mycalex cylinder in order to prevent sideways slippage of the pistons and also to keep the polymer from being forced out from between as pressure was applied. Mycalex was chosen as the retaining ring because of its good mechanical properties coupled with the fact that it is a good insulator. Lexan sheets, ⅛″ thick, were placed between the load distributing discs and the hydraulic press to insulate the electrodes of the pressure cell. Lexan is a good insulator and has a relatively constant dielectric constant over the range of temperatures at which the samples were examined.

Each samples was made by placing a small amount of polymer powder in the cell and then molding it at 125° C. and 10,000 atmospheres into a small pellet. To insure that the sample was properly molded the pressure was cycled between zero and 10,000 atmospheres three times.

Prior to making any measurements on any sample, the resistivity and capacity of the pressure cell were checked with a polystyrene spacer between the pistons. The resistivity was checked to see that it was greater than 5 to 10 megohms and the capacity was noted as a function of frequency and temperature, so that when a polymer sample was substituted for the polystyrene spacer the contribution of capacitance of the pressure cell would be known.

Conductivity was measured as a function of field strength and pressure for constant values of temperature. Capacitance measurements were made using a variable frequency sinusoidal oscillator in the modified Schering bridge. The variation of capacitance as a function of frequency, field intensity, pressure and temperature, was evaluated in the same manner as the conductive measurements were made.

Table I furnishes resistivity values of various PAQR polymers produced as in Example 1.

TABLE I

[Acene/Pyromellitic Anhydride/ZnCl₂=1/1/2]

| Sample No. | Acene | Polymerization Temperature, °C. | Resistivity Ohm-centimeters at 25° C. |
|---|---|---|---|
| 1 | Terphenyl | 253 | 5.6×10¹⁰ |
| 2 | do | 306 | 1.4×10⁷ |
| 3 | Triphenylchloromethane | 253 | 4.6×10¹¹ |
| 4 | do | 306 | 3.7×10⁹ |
| 5 | Triphenylmethane | 253 | 5.8×10¹¹ |
| 6 | do | 306 | 3.1×10⁹ |
| 7 | Ferrocene | 253 | 1.7×10⁹ |

Example 8

Polymers formed by the condensation of acenes with phthalic anhydride under the same conditions as Example 1.

Examples 9–11

A series of polymers were produced similarly as in Example 1 utilizing the ratio of acene to pyromellitic acid anhydride to zinc chloride according to Table II.

TABLE II

| Sample No. | Acene | Ratio Acene/PMA/ZnCl$_2$ | Polymerization Temperature, °C. |
|---|---|---|---|
| 9 | Pyrene | 1/1/1 | 300 |
| 10 | Anthraquinone | 2/1/2 | 300 |
| 11 | Pyrene | 1/1/2 | 300 |

Conductivity (the reciprocal of resistivity) of the polymers was measured as a function of field strength and pressure for constant values of temperature. The temperature was controlled by two thermostatically controlled platens on a Preco hydraulic press, Model RA6, and it was monitored by a Leeds and Northrup Temperature Indicating Potentiometer System with a copper-constantan thermocouple. The thermocouple was attached to the lower piston about ⅜″ from the sample. This enabled control of the temperature to within ±1° C. for the pressure cell lay in a glass wool jacketed enclosure.

Table III shows the specific conductivity at 240° C. and 1800 atmospheres of the polymers of Table II as well as the specific resistivity.

TABLE III

| Sample No. | Specific Conductivity (mho/cm.) | Resitivity (ohm-cm.) |
|---|---|---|
| 9 | 13×10$^{-6}$ | 7.7×10$^4$ |
| 10 | 23×10$^{-6}$ | 4.3×10$^4$ |
| 11 | 16×10$^{-6}$ | 6.3×10$^4$ |

FIGURES 1, 2 and 3 show the variation of the relative dielectric constant $\epsilon_r$ versus frequency for Samples 9, 10 and 11, respectively. The curves are plotted for various constant field strengths at 24° C. and it is seen that the greatest decrease in $\epsilon_r$ for increasing field occurs at low frequency. At higher frequency the effect of variations in the field's magnitude becomes negligible.

FIGURES 4, 5 and 6 show the variation of the relative dielectric constant versus frequency for various temperatures at a constant field strength of 72 volts/cm.

The effect of increased pressure on the dielectric constant is felt to be relatively negligible. An increase in pressure from 1400 atmospheres to about 7000 atmospheres caused an increase of about 10 to 15% in the PAQR sample cell capacitance. This increase is probably due to the compression and corresponding decrease in the thickness of the sample.

The extremely high dielectric constant observed at low frequency is not an ordinary occurrence in organic solids. Most organic solids exhibit relative dielectric constants of the order of 1 to 10$^1$.

It will be noted that, particularly at low frequencies, the capacitors made containing these materials have capacities from 100 to 900 times the vacumm capacitance. The temperature behaviors, apparently at first sight irregular, have a pattern characteristic of viscous polymers. The dependence on frequency is very marked and indicates their potential uses in frequency sensitive devices, either as ballast elements or otherwise. The changeover from the ferro-electric type behavior (i.e. with dielectric constants of over, say, 100) to the more usual low dielectric constant behavior (dielectric constants less than, say, 20) is most marked with frequency.

These particular materials all have conductivities of about 10$^{-5}$ mho/cm. (i.e. resistivities of about 10$^5$ ohm/cm.). As a consequence the capacitors here described are quite "lossy" in contrast to usual insulators, but in view of their interesting and highly unusual overall electronic characteristics they present the electrical and instrument engineers with valuable new tools.

The preceding specific embodiments are illustrative of the invention. They are not, however, to be deemed limitative. Alternate processes and materials known to those skilled in the art may be employed without departing from the spirit of the invention or the scope of the appended claims.

I claim:

1. A capacitor having a high capacitance in a minimum volume comprising metal conductors separated by a dielectric consisting of a microscopically-homogeneous, electronically-conductive, polymeric, eka-conjugated, organic molecular solid having a specific resistivity over about 10$^3$ ohm-centimeters at 25° C.

2. A capacitor having a high capacitance in a minimum volume comprising metal conductors separated by a dielectric consisting of a microscopically-homogeneous, electronically-conductive, polymeric organic molecular solid having a highly conjugated molecular structure and having a specific resistivity over about 10$^3$ ohm-centimeters at 25° C.

3. A capacitor having a high capacitance in a minimum volume comprising metal conductors separated by a dielectric consisting of a PAQR high molecular weight polymer having a specific resistivity over about 10$^3$ ohm-centimeters at 25° C.

4. The capacitor of claim 3 wherein said PAQR high molecular weight polymer is derived from the condensation of anthracene with pyromellitic anhydride in the presence of a Friedel-Crafts catalyst.

5. The capacitor of claim 3 wherein said PAQR high molecular weight polymer is derived from the condensation of triphenylchloromethane with pyromellitic anhydried in the presence of a Friedel-Crafts catalyst.

6. The capacitor of claim 3 wherein said PAQR high molecular weight polymer is derived from the condensation of terphenyl with pyromellitic anhydride in the presence of a Friedel-Crafts catalyst.

7. The capacitor of claim 3 wherein said PAQR high molecular weight polymer is derived from the condensation of pyrene with pyromellitic anhydride in the presence of a Friedel-Crafts catalyst.

References Cited

UNITED STATES PATENTS

| 2,985,757 | 5/1961 | Jacobs | 317—246 X |
| 3,214,648 | 10/1965 | Ross | 317—258 X |
| 3,257,607 | 6/1966 | Pintell. | |

OTHER REFERENCES

Du Pont Tedlar PVF Film Brochure Bulletin TD 4, March 1963.

Phol and Engelhardt: Synthesis and Characterization of Some Highly Conjugated Semiconducting Polymers in Journal of Physical Chemistry, Vol. 66, 1962, pp. 2085–95.

LARAMIE E. ASKIN, *Primary Examiner.*

E. GOLDBERG, *Assistant Examiner.*